United States Patent
Guan

(10) Patent No.: US 10,158,289 B2
(45) Date of Patent: Dec. 18, 2018

(54) DC/DC CONVERTER

(71) Applicant: Rohm Co., Ltd., Kyoto (JP)

(72) Inventor: Shidong Guan, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/801,391

(22) Filed: Nov. 2, 2017

(65) Prior Publication Data

US 2018/0131275 A1    May 10, 2018

(30) Foreign Application Priority Data

Nov. 7, 2016 (JP) .................................. 2016-216969
Sep. 27, 2017 (JP) .................................. 2017-186329

(51) Int. Cl.
*H02M 3/156* (2006.01)
*H02M 3/158* (2006.01)
*H02M 1/00* (2006.01)

(52) U.S. Cl.
CPC ......... *H02M 3/156* (2013.01); *H02M 3/1588* (2013.01); *H02M 2001/0048* (2013.01); *H02M 2003/1566* (2013.01)

(58) Field of Classification Search
CPC ...... H02M 3/156; H02M 3/155; H02M 3/145; H02M 3/158; H02M 3/157; H02M 3/1563; G05F 5/00
USPC .......................... 323/222, 271, 282–285, 299
See application file for complete search history.

(56) References Cited

U.S. PATENT DOCUMENTS

| | | | |
|---|---|---|---|
| 2007/0170904 A1 | 7/2007 | Hojo | |
| 2011/0057634 A1* | 3/2011 | Kunimatsu | H02M 3/156 323/282 |
| 2012/0038341 A1* | 2/2012 | Michishita | H02M 3/156 323/284 |
| 2012/0313601 A1 | 12/2012 | Deguchi et al. | |
| 2015/0229212 A1* | 8/2015 | Shiwaya | H02M 3/158 323/282 |

FOREIGN PATENT DOCUMENTS

| | | |
|---|---|---|
| JP | 2012-060883 | 3/2012 |
| JP | 2012-257408 | 12/2012 |
| WO | 2005/078910 | 8/2005 |

* cited by examiner

*Primary Examiner* — Nguyen Tran
(74) *Attorney, Agent, or Firm* — Fish & Richardson P.C.

(57) ABSTRACT

A DC/DC converter includes a switching element connected to an input voltage so as to be turned on/off, a driving circuit arranged to perform ON/OFF control of the switching element, an inductor arranged to flow current controlled by the switching element, a smoothing capacitor connected to the inductor so as to perform rectifying operation together with the inductor, an oscillator arranged to generate a rectangular wave signal for operating the driving circuit, and an output current detector arranged to detect output detection current flowing in the switching element or the inductor. The oscillator generates the rectangular wave signal at a fixed oscillation frequency when the output detection current is a predetermined value or larger, while it generates the rectangular wave signal at an oscillation frequency lower than the fixed oscillation frequency and proportional to the output detection current when the output detection current is smaller than the predetermined value.

48 Claims, 13 Drawing Sheets

DC/DC CONVERTER

CROSS-REFERENCE TO RELATED APPLICATIONS

This nonprovisional application claims priority under 35 U.S.C. § 119(a) on Patent Applications No. 2016-216969 and No. 2017-186329 filed in Japan on Nov. 7, 2016 and Sep. 27, 2017, respectively, the entire contents of which are hereby incorporated by reference.

BACKGROUND OF THE INVENTION

Field of the Invention

The invention disclosed in this specification relates to a DC/DC converter that switches between PWM method and PFM method responding to small load or large load.

Description of Related Art

Conventionally, a portable electronic device is equipped with a battery as a drive power source. An output voltage of a battery becomes lower due to use of the device or discharge, and hence the electronic device is provided with a DC voltage conversion circuit (DC/DC converter) that converts a battery voltage into a constant voltage. A portable electronic device is provided with a synchronous rectification DC/DC converter having a small size and high conversion efficiency. The synchronous rectification DC/DC converter is usually a pulse width modulation (PWM) method DC/DC converter, and includes a main switching transistor and a synchronization transistor, which are alternately on-off controlled. In other words, the main switching transistor is turned on so that energy is supplied from an input side to an output side, and the main switching transistor is turned off so that energy stored in a choke inductor is discharged. At this moment, in synchronization with timing when the energy stored in the choke inductor is discharged to a load side, the synchronization transistor is turned off. Then, a pulse width of a pulse signal that drives the main switching transistor is controlled according to output voltage or output current, so that the output voltage is maintained to be substantially constant.

In the DC/DC converter described above, when voltage conversion of the battery voltage is performed, high conversion efficiency is required over a wide range of load area from heavy load of large power supply to light load of small power supply. However, it is generally known that in light load, power loss of the DC/DC converter generated when driving the main switching transistor is larger than power consumption in the load, and hence conversion efficiency is largely decreased.

Accordingly, in order to improve the decrease in conversion efficiency in light load, there proposed a DC/DC converter that switches from the PWM method to a pulse frequency modulation (PFM) method in light load. In this DC/DC converter, the PWM method is used in a normal operation including operation in heavy load, and the PFM method is used in light load. This PFM method include a true PFM method in which the switching frequency of a drive signal supplied to the main switching transistor is controlled according to the output voltage of the DC/DC converter, and a pseudo PFM method in which the switching frequency of the drive signal supplied to the main switching transistor is maintained to be constant, and switching operation is thinned according to the output voltage of the DC/DC converter. In either PFM method, the switching frequency in light load becomes lower than that in the PWM method, and hence power loss of the DC/DC converter can be reduced. Thus, a decrease in conversion efficiency in light load can be suppressed.

Note that as a conventional technique related to above description, there is JP-A-2012-60883 (hereinafter referred to Patent Document 1).

In addition, conventionally, in order to achieve high efficiency in a DC/DC converter, simple light load mode (SLLM) control in no-load or light load is introduced in addition to the PWM control. According to a DC/DC converter using this SLLM control technique, an offset voltage is added to a current detection voltage that indicates a detected value of current flowing in an inductor, and hence it is confirmed that the current detection voltage is higher than a difference between the output voltage and a reference voltage in a comparator, in no-load or light load in which the difference between the output voltage and the reference voltage is decreased. In this case, an oscillator signal of an oscillator that turns on a switching element can be disabled, and hence switching operation of the switching element can be intermittently controlled until the difference between the output voltage and the reference voltage become large. Therefore, it is not necessary to additionally provide a comparator for intermittent control, and efficiency can be higher than a DC/DC converter using current mode PWM control in light load or no-load, and further the device can be downsized.

Note that as a conventional technique related to above description, there is PCT international publication WO2005/078910 (hereinafter referred to Patent Document 2).

In addition, conventionally, there is a known switching regulator that has high efficiency also in light load. For example, oscillation frequency of an oscillator is controlled by an output signal of an error amplifier, and an output signal of the oscillator is used for ON/OFF control of a switching element. Thus, the oscillation frequency is controlled to be low in light load so that switching loss can be reduced.

Note that as a conventional technique related to above description, there is JP-A-2012-257408 (hereinafter referred to Patent Document 3).

However, in switching between the PWM method and the PFM method in the DC/DC converter of Patent Document 1, there is a problem that load current fluctuates depending on input and output setting (i.e., a difference between an input voltage and an output voltage).

In addition, in the DC/DC converter using the SLLM control technique of Patent Document 2, it is difficult to maintain high efficiency of the DC/DC converter in light load or no-load. Further, as the output current is smaller, efficiency is decreased more.

In addition, in the method disclosed in Patent Document 3, the load current is not directly detected to control the oscillation frequency, as asynchronous control, and hence there is a problem that quantitative control cannot be realized. For this reason, periodic fluctuation may occur, and hence there is a problem that the fluctuation causes audible noise when it is in an audible range.

SUMMARY OF THE INVENTION

It is an object of the invention disclosed in this specification to solve the problems described above, i.e. to provide a DC/DC converter capable of improving conversion efficiency of a power supply by quantitatively detecting load current, controlling an internal clock so as to determine a light or heavy state of load, and switching between the PWM method and the PFM method, and also to provide a space-saving DC/DC converter that does not cause sounding.

Accordingly, a DC/DC converter disclosed in this specification includes a switching element connected to an input voltage so as to be turned on and off, a driving circuit arranged to perform ON/OFF control of the switching element, an inductor arranged to flow current controlled by the switching element, a smoothing capacitor connected to the inductor so as to perform rectifying operation together with the inductor, an oscillator arranged to generate a rectangular wave signal for operating the driving circuit, and an output current detecting portion arranged to detect output detection current flowing in the switching element or the inductor. The oscillator generates the rectangular wave signal at a fixed oscillation frequency when the output detection current is a predetermined value or larger, while it generates the rectangular wave signal at an oscillation frequency lower than the fixed oscillation frequency and proportional to the output detection current when the output detection current is smaller than the predetermined value.

In addition, the power supply controller disclosed in this specification includes an oscillator arranged to generate a rectangular wave signal, and a driving circuit arranged to drive a switching output stage of the DC/DC converter in synchronization with the rectangular wave signal. The oscillator sets oscillation frequency of the rectangular wave signal to a fixed value when the output detection current flowing in the switching output stage is larger than a predetermined value, and it decreases the oscillation frequency of the rectangular wave signal from the fixed value more as the output detection current becomes smaller when the output detection current is smaller than the predetermined value.

Note that other features, elements, steps, advantages, and characteristics of the present invention will become more apparent from the description of the best mode embodiment given below and the related attached drawings.

DETAILED DESCRIPTION OF THE PREFERRED EMBODIMENTS

First Embodiment of Present Invention

Figure 1:
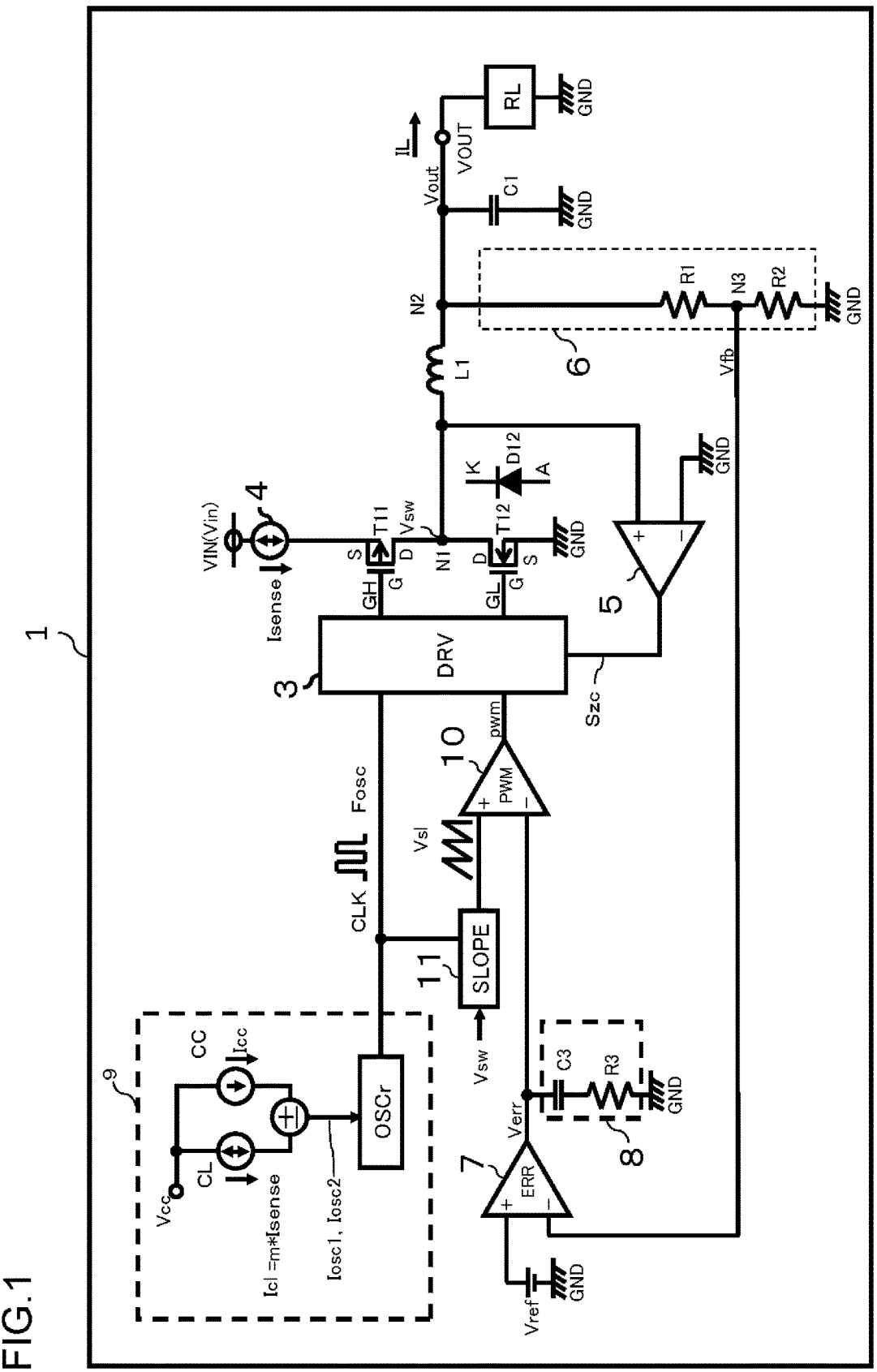
FIG. 1 is a circuit diagram of a current mode synchronous rectification step-down type DC/DC converter related to a DC/DC converter of the present invention.

FIG. 1 is a circuit diagram of a current mode synchronous rectification step-down type DC/DC converter according to the present invention. A DC/DC converter 1 of this structural example steps down an input voltage Vin supplied to an input terminal VIN so as to generate a desired output voltage Vout at an output terminal VOUT.

The DC/DC converter 1 of this structural example includes a switching element T11, a rectifier element T12, a driving circuit 3, an output current detecting portion 4, a reverse current detection circuit 5, a feedback voltage generating circuit 6, an error amplifier 7, a phase compensation circuit 8, an oscillator 9, a PWM comparator 10, a slope voltage generating circuit 11, an inductor L1, and a smoothing capacitor C1.

The switching element T11 is a P-channel metal oxide semiconductor (MOS) field effect transistor connected to the driving circuit 3, the output current detecting portion 4, and the rectifier element T12, and it functions as a switching transistor that repeats turning on and off so as to control current flowing in the inductor L1. The source S of the switching element T11 is connected to the output current detecting portion 4. The drain D of the switching element T11 is connected to the drain D of the rectifier element T12. The gate G of the switching element T11 is applied with a gate signal GH from the driving circuit 3. The switching element T11 is turned off when the gate signal GH is high level and is turned on when the gate signal GH is low level. The rectifier element T12 supplies current to the inductor L1 when the switching element T11 is turned off.

The rectifier element T12 is an N-channel MOS field effect transistor connected to the switching element T11 and the driving circuit 3, and it operates as an synchronous rectification transistor in synchronization with the switching element T11 and in a complementary manner with the same. The drain D of the rectifier element T12 is connected to the drain D of the switching element T11. The common connection node of the rectifier element T12 and the switching element T11 is shown as a node N1. The rectifier element T12 is turned on when the switching element T11 is turned off, while it is turned off when the switching element T11 is turned on. The source S of the rectifier element T12 is connected to a ground potential GND. The gate G of the rectifier element T12 is applied with a gate signal GL from the driving circuit 3. The rectifier element T12 is turned on when the gate signal GL is high level, while it is turned off when the gate signal GL is low level.

When the switching element T11 and the rectifier element T12 are turned on and off in a complementary manner, a rectangular wave-like switching voltage Vsw appears at the node N1. This switching voltage Vsw is smoothed by the inductor L1 and the smoothing capacitor C1, and hence the output voltage Vout is output at the output terminal VOUT. The inductor L1 and the smoothing capacitor C1 are connected in series between the node N1 and the ground potential GND, and the common connection node between them is shown as a node N2. The voltage generated in the smoothing capacitor C1, i.e., the output voltage Vout is generated at the node N2.

In the DC/DC converter 1 of this structural example, the switching element T11, the rectifier element T12, the inductor L1, and the smoothing capacitor C1 are used for forming a step-down type switching output stage that steps down the input voltage Vin supplied to the input terminal VIN so as to generate the desired output voltage Vout at the output terminal VOUT.

Note that when integrating structural elements (denoted by numerals 3 to 11, etc.) of the DC/DC converter 1 into an IC, the switching element T11 and the rectifier element T12 may be incorporated in the IC or may be externally connected to the IC. In case where they are externally connected to the IC, external terminals are necessary for externally outputting the gate signal GH and the gate signal GL, individually. In addition, an N-channel MOS field effect transistor can be used as the switching element T11. In addition, an insulated gate bipolar transistor (IGBT) or the like can be used as the switching element T11 or the rectifier element T12. In addition, the switching element T11 and the rectifier element T12 may be constituted of bipolar transistors.

In addition, as a rectification method of the switching output stage, an asynchronous rectification method can be adopted instead of the synchronous rectification method using the rectifier element T12. In this case, a rectifier diode D12 is used as a substitute for the rectifier element T12. In this case, the cathode K of the rectifier diode D12 should be connected to the node N1, and the anode A of the rectifier diode D12 should be connected to the ground potential GND.

In order to prevent excessive through current flowing from the switching element T11 toward the rectifier element T12, the driving circuit 3 is provided with a period in which the gate signal GH is high level while the gate signal GL is low level (so-called dead time), so that low level of the gate signal GH and high level of the gate signal GL do not simultaneously occur.

Further, the driving circuit 3 also has a function of forcibly stopping the switching operation of the switching output stage according to a not shown abnormality protection signal (a function of setting high level to the gate signal GH output to the switching element T11 while setting low level to the gate signal GL output to the rectifier element T12).

The output current detecting portion 4 detects output detection current Isense flowing from the input terminal VIN to the switching element T11. The output detection current Isense is current proportional to load current IL flowing in a load RL and is current on which a state of the load RL is reflected. Therefore, by detecting the output detection current Isense, it is possible to determine which one of no-load, light load, medium load, and heavy load the load RL is.

The reverse current detection circuit 5 detects reverse current to the rectifier element T12, i.e. current flowing from the inductor L1 to the ground potential GND via the rectifier element T12. Presence or absence of the reverse current can be detected by detecting a so-called zero cross point at which the switching voltage Vsw is switched from negative to positive in the period while the rectifier element T12 is turned on. If predetermined or more reverse current is detected, the reverse current detection circuit 5 outputs a zero cross detection signal Szc, and on the basis of this zero cross detection signal Szc, the gate signal GL is generated so that the rectifier element T12 is turned off.

The feedback voltage generating circuit 6 is constituted of resistors R1 and R2 connected in series between the output terminal VOUT and the ground potential GND, and outputs a feedback voltage Vfb from a node N3 that is the common connection node between them. The feedback voltage Vfb is a voltage proportional to a voltage generated at the smoothing capacitor C1, and is also a DC voltage proportional to the output voltage Vout generated at the output terminal VOUT.

The error amplifier 7 generates an error voltage Verr according to a difference between a reference voltage Vref input to a noninverting input terminal (+) and the feedback voltage Vfb input to an inverting input terminal (−). The error voltage Verr is increased when the feedback voltage Vfb is lower than the reference voltage Vref, while it is decreased when the feedback voltage Vfb is higher than the reference voltage Vref. The error voltage Verr is output from an output side of the error amplifier 7. Note that it is possible to output not the voltage but current after conversion from the output side of the error amplifier 7, The error amplifier having such a structure is known as a transconductance error amplifier.

The phase compensation circuit 8 is constituted of a series circuit of a resistor R3 and a capacitor C3 connected in series between an output terminal of the error amplifier 7 and the ground potential GND. It is well known that such a phase compensation circuit is used for a DC/DC converter. The phase compensation circuit 8 is used for enhancing phase margin, which is a difference to a phase delay of 180 degrees in the DC/DC converter 1. For example, supposing that the phase is e.g. 120 degrees when a loop gain of the DC/DC converter 1 is 0 dB (a gain of one), then the phase margin becomes 60 degrees that is 180 degrees minus 120 degrees. This phase margin is also said to be sufficient if it is 45 degrees or larger, for example.

The oscillator 9 is constituted of a constant current source CC, a linear current source CL, and an oscillator portion OSCr, which are connected to the power supply voltage Vcc. The oscillator portion OSCr is constituted of a well-known CR oscillator, or a circuit including inverters or differential amplifiers connected in a ring shape, for example. With any circuit structure, in the present invention, oscillation frequency Fosc of a clock signal CLK generated by the oscillator portion OSCr is controlled based on oscillator current (Iosc1, Iosc2) set by the sum (+) of constant current Icc generated by the constant current source CC and linear current Icl generated by the linear current source CL, or a difference (−) between them.

The constant current Icc generated by the constant current source CC has always a constant current value regardless of whether the DC/DC converter 1 uses PWM control or PFM control. For this reason, it is called a constant current source. On the other hand, the linear current Icl generated by the linear current source CL has a constant current value when the DC/DC converter 1 is driven by the PWM method, but it has a variable current value proportional to the output detection current Isense detected by the switching element T11 when the DC/DC converter 1 is driven by the PFM method. For this reason, it is called a linear current source. The linear current Icl generated by the linear current source CL is set to have a value obtained by multiplying the output detection current Isense by a predetermined coefficient m, i.e. Icl=m*Isense holds.

In order to generate the linear current Icl responding to the output detection current Isense and the constant current Icc not responding to the output detection current Isense, to add or subtract them, and to set a current ratio between them, it is preferred to use a current mirror circuit, for example.

The PWM comparator 10 compares the error voltage Verr applied to the inverting input terminal (−) with a voltage of a slope signal Vsl applied to the noninverting input terminal (+) so as to generate a pulse width modulated signal pwm. On the basis of the pulse width modulated signal pwm, the DC/DC converter 1 performs the PWM control.

The pulse width modulated signal pwm output from the PWM comparator 10 is applied to the driving circuit 3 of the post stage, so that the switching element T11 and the rectifier element T12 are turned on and off in a complementary manner. Inside the driving circuit 3, there is a not shown sequential circuit (e.g. an RS flip-flop). A set terminal of this RS flip-flop is applied with the clock signal CLK that is a rectangular wave signal generated by the oscillator 9, and a reset terminal thereof is applied with the pulse width modulated signal pwm. In this case, the clock signal CLK corresponds to a set signal of the RS flip-flop, and the pulse width modulated signal pwm corresponds to a reset signal of the RS flip-flop.

The slope voltage generating circuit 11 generates the slope signal Vsl for operating the PWM comparator 10 by the pulse width modulation. The slope signal Vsl is a triangular wave-like signal generated based on the clock signal CLK generated by the oscillator 9. Note that a voltage on which the switching voltage Vsw extracted from the node N1 is reflected is superimposed on the slope voltage generating circuit 11. More specifically, the slope voltage generating circuit 11 receives the input voltage Vin and the switching voltage Vsw, so as to generate the slope signal Vsl on which a voltage between both terminals of the switching element T11 (i.e. Vin−Vsw=Isense×Ron(T11), where Ron (T11) is an on-resistance of the switching element T11) is reflected. In this way, a voltage on which the output detection current Isense or the load current IL is reflected is superimposed on the voltage waveform of the slope signal Vsl, so that a well-known current mode type DC/DC converter is constituted. Note that the current mode type DC/DC converter is not an essential structural element in the present invention, but the present invention can also be applied to a voltage mode type.

Figure 2:
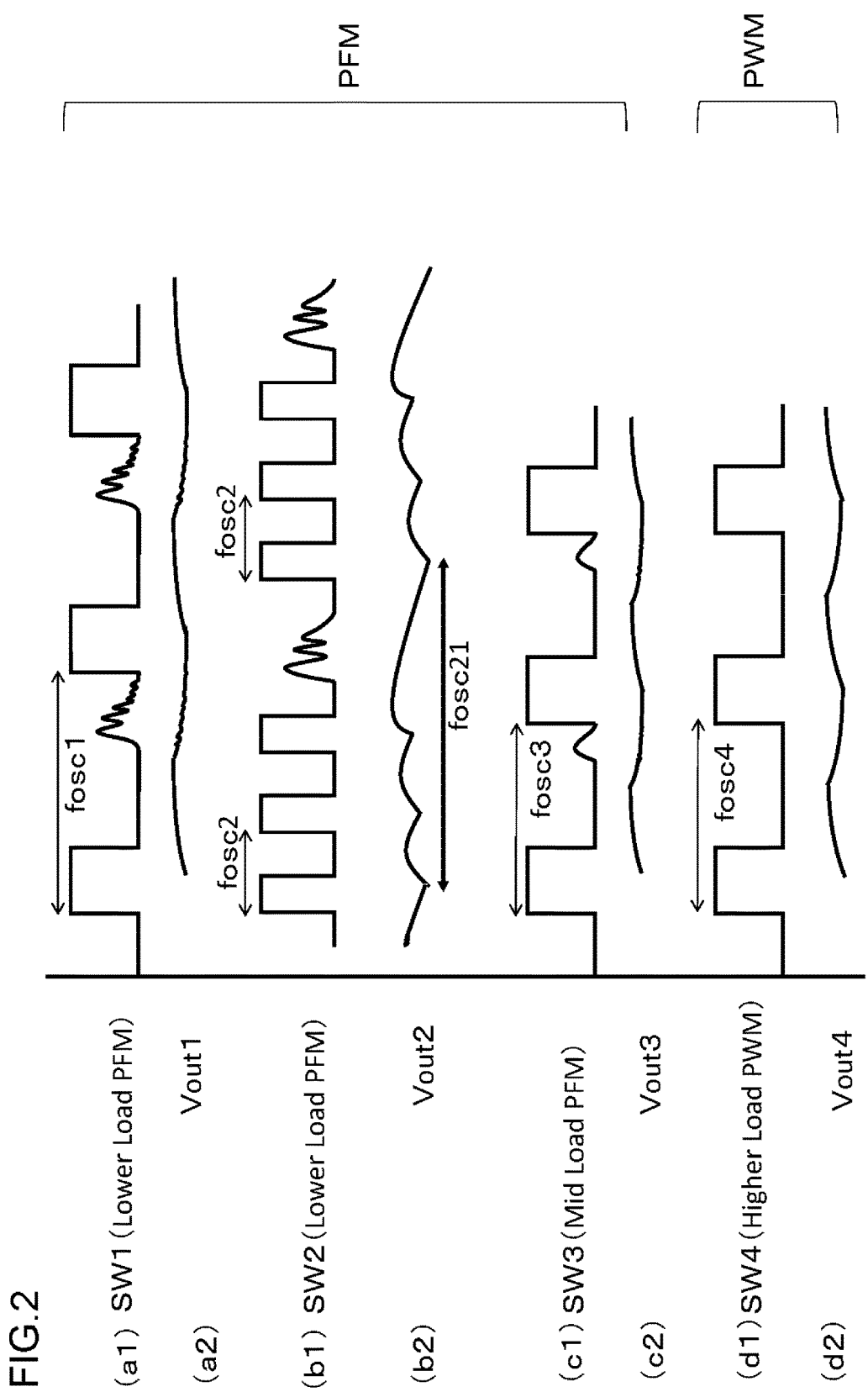
FIG. 2 is a signal waveform diagram of an output portion of the DC/DC converter of FIG. 1.

FIG. 2 shows signal waveforms output from an output stage of the DC/DC converter 1 shown in FIG. 1, i.e. at the node N1 and the output terminal VOUT. With reference to FIG. 1, description of FIG. 2 is added below.

Signal waveforms (a1) and (a2) in FIG. 2 are in a case where the DC/DC converter 1 is in light load and is controlled by the frequency modulation (PFM) method. Signal waveform (a1) in FIG. 2 shows the switching voltage Vsw at the node N1 (referred to as a switching voltage SW1). The frequency of the switching voltage SW1 is denoted by fosc1. A discontinuous signal component between rectangular signals is generated by zero cross phenomenon generated in no-load or light load. The zero cross means a state where the minimum value of the triangular wave current flowing at the node N1 becomes lower than the zero value after switching from an on-period of the switching element T11 to an on-period of the rectifier element T12 shown in FIG. 1.

In the conventional control method, periodic fluctuation appears in the output voltage Vout so that a ripple component becomes large. Other than that, when current flows in an input capacitor or an output capacitor, a so-called switching noise signal occurs. If frequency of this switching noise signal is in the audible frequency band, the noise becomes audible for human ears and causes annoyance. The present invention can prevent sounding due to switching noise in light load and sounding due to fluctuation of the output voltage Vout or fluctuation of the input voltage Vin just before switching between light load and heavy load, by means of synchronous control. In order to suppress such switching noise, the oscillator 9 is controlled so that the frequency used in the PFM method becomes higher than the audible frequency band (e.g., so that the oscillation frequency becomes higher than 20 KHz).

Signal waveform (a2) in FIG. 2 shows the output voltage Vout (referred to as an output voltage Vout1) output at the output terminal VOUT under the condition of (a1) described above. A ripple component is superimposed on the output voltage Vout1 generated at the output terminal VOUT. This ripple component has a voltage of a few tens to a hundred millivolts though the vertical scale is enlarged in FIG. 2 for convenience of drawing.

Signal waveforms (b1) and (b2) of FIG. 2 show the switching voltage Vsw (referred to as a switching voltage SW2) in a case where the DC/DC converter 1 is in light load and is controlled by the frequency modulation (PFM) method, in the same manner as Signal waveforms (a1) and (a2) in FIG. 2. The frequency of the switching voltage SW2 shown in Signal waveform (b1) of FIG. 2 is denoted by fosc2, and this frequency fosc2 is higher than the frequency fosc1 of the switching voltage SW1 shown in Signal waveform (a1) of FIG. 2. However, under the condition of (b1) described above, the ripple component of frequency fosc21 lower than the frequency fosc1 is contained in the output voltage Vout (referred to as an output voltage Vout2) output at the output terminal VOUT. For example, the frequency fosc2 is 100 KHz and is sufficiently higher than the audible frequency band, but the frequency fosc21 may become lower than the audible frequency band. In this event, so-called "beat sound" generated in the smoothing capacitor C1 becomes audible for human ears or affects other electronic devices as noise, and causes annoyance to humans. In order to resolve this problem, in the present invention, the output detection current Isense is detected, and the oscillation frequency Fosc of the oscillator 9 is controlled. In this way, stable switching is performed, and a frequency component such as the frequency fosc21 is not generated.

Signal waveform (b1) in FIG. 2 shows the switching voltage Vsw (referred to as a switching voltage SW3) in a case where the DC/DC converter 1 is controlled by the frequency modulation (PFM) method in the same manner as Signal waveform (a1) of FIG. 2, and is in medium load larger than that of Signal waveform (a1) of FIG. 2. The frequency of the switching voltage SW3 is denoted by fosc3. The frequency fosc3 is higher than the frequency fosc1 shown in Signal waveform (a1) of FIG. 2, and relationship of fosc3>fosc1 is satisfied. Therefore, although the same PFM method is used, the control is performed so that the oscillation frequency Fosc of the clock signal CLK generated by the oscillator 9 becomes higher as the load becomes larger, while it becomes lower as the load becomes smaller. Note that generation period and amplitude of the discontinuous signal component between rectangular signals of each of the switching voltages SW2 and SW3 correspond to the zero cross.

Signal waveform (c2) of FIG. 2 shows the output voltage Vout (referred to as an output voltage Vout3) output at the output terminal VOUT under the condition of (c1) described above. Note that a ripple component is superimposed on the output voltage Vout3 generated at the output terminal VOUT, in the same manner as Signal waveform (a2) of FIG. 2.

Signal waveforms (d1) and (d2) of FIG. 2 show the switching voltage Vsw (referred to as a switching voltage SW4) in a case where the DC/DC converter 1 is controlled by the pulse width modulation (PWM) method, unlike Signal waveforms (a1), (a2), (b1), (b2), (e1), and (c2) of FIG. 2, i.e. in a case of heavy load. The frequency of the switching voltage SW4 is denoted by fosc4. Note that there is no period for generating a discontinuous signal component between rectangular signals of the switching voltage SW4. This is because in heavy load, the minimum value of the triangular wave-like current (coil current) is sufficiently higher than the ground potential GND so that no zero cross is generated.

Signal waveform (d2) of FIG. 2 shows the output voltage Vout (referred to as an output voltage Vout4) output at the output terminal VOUT under the condition of (d1) described above. A ripple component is superimposed on the output voltage Vout4 generated at the output terminal VOUT, in the same manner as Signal waveforms (a2), (b2), and (c2) of FIG. 2.

Second Embodiment of Present Invention

Figure 3:
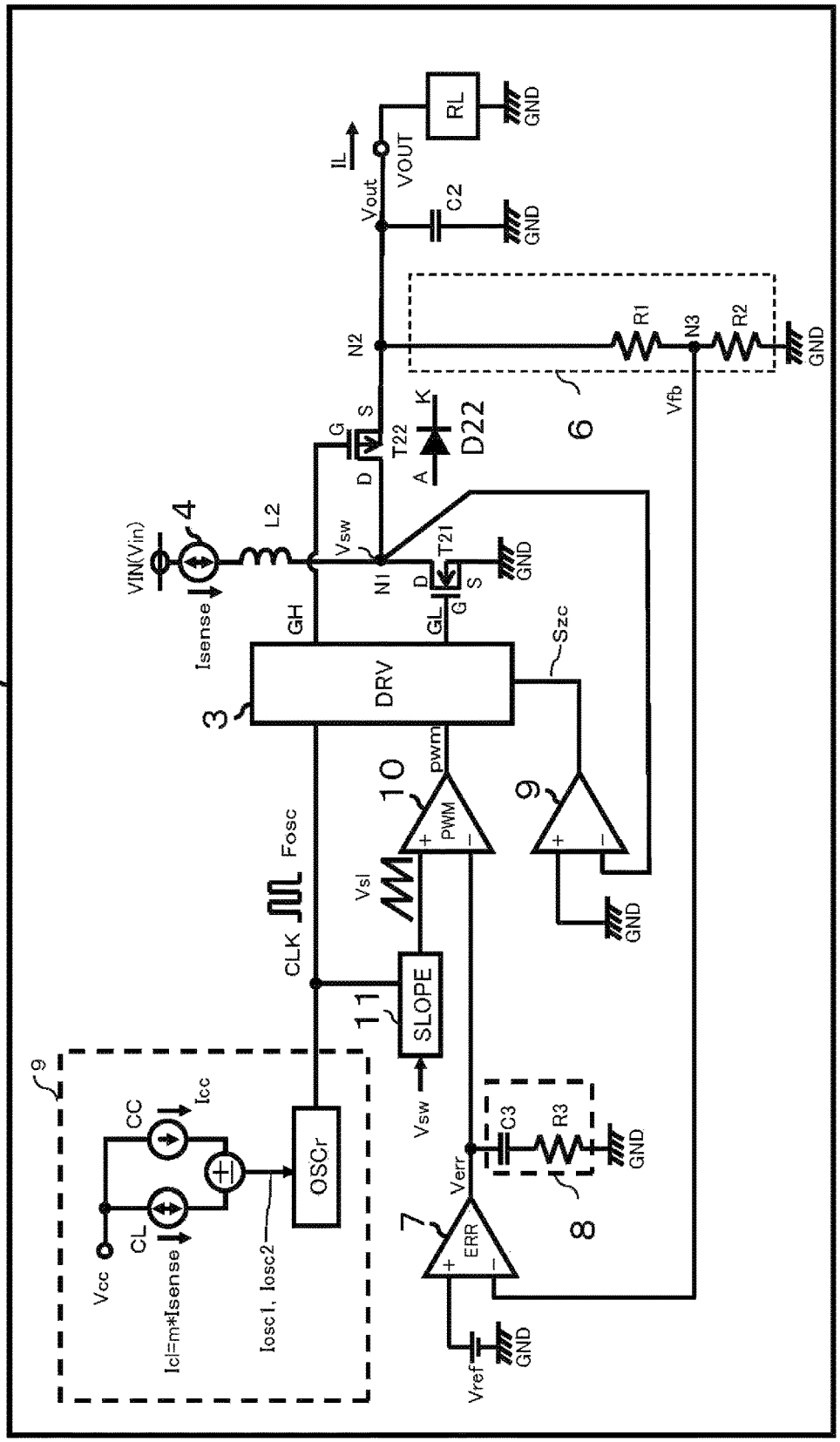
FIG. 3 is a circuit diagram of a current mode synchronous rectification step-up type DC/DC converter related to a DC/DC converter of the present invention.

FIG. 3 is a circuit diagram showing a current mode synchronous rectification step-up type DC/DC converter according to the present invention. The DC/DC converter 2 steps up the input voltage Vin supplied to the input terminal VIN so as to output the desired output voltage Vout at the output terminal VOUT.

The DC/DC converter 2 of this structural example includes a switching element T21, a rectifier element T22, the driving circuit 3, the output current detecting portion 4, the reverse current detection circuit 5, the feedback voltage generating circuit 6, the error amplifier 7, the phase compensation circuit 8, the oscillator 9, the PWM comparator 10, the slope voltage generating circuit 11, an inductor L2, and a smoothing capacitor C2.

The DC/DC converter 2 is different from the step-down type shown in FIG. 1 concerning the circuit portion as a post stage of the driving circuit 3. Other circuit portions are the same. The different circuit portion is described below.

The switching element T21 is an N-channel MOS field effect transistor connected to the rectifier element T22, the driving circuit 3, and the inductor L2, and it functions as a switching transistor that repeats turning on and off so as to control current flowing in the inductor L2. The switching element T21 operates in synchronization with the rectifier element T22 and in a complementary manner with the same. The source S of the switching element T21 is connected to the ground potential GND. The drain D of the switching element T21 is commonly connected to the drain D of the rectifier element T22 and one terminal of the inductor L2. This common connection node is denoted by the node N1. The gate G of the switching element T21 is applied with the gate signal GL from the driving circuit 3. The switching element T21 is turned on when the gate signal GL is high level, while it is turned off when the gate signal GL is low level.

The other terminal of the inductor L2 is connected via the output current detecting portion 4 to the input terminal VIN to which the input voltage Vin is supplied. In other words, the switching element T21 is connected via the inductor L2 to the input voltage Vin. The switching element T21 controls current flowing in the inductor L2.

The drain D of the rectifier element T22 is connected to the drain D of the switching element T21 and one terminal of the inductor L2. The source S of the rectifier element T22 is connected to the node N2, i.e. the output terminal VOUT. The gate G of the rectifier element T22 is applied with the gate signal GH from the driving circuit 3. The rectifier element T22 is turned off when the gate signal GH is high level, while it is turned on when the gate signal GH is low level.

The smoothing capacitor C2 is connected between the node N2, i.e. the output terminal VOUT and the ground potential GND. The smoothing capacitor C2 performs rectifying and smoothing operation together with the inductor L2 and the rectifier element T22.

It is possible to adopt an asynchronous rectification method instead of the synchronous rectification method using the rectifier element T22. In this case, a rectifier diode D22 is used as a substitute for the rectifier element T22. In this case, the anode A of the rectifier diode D22 should be connected to the node N1, and the cathode K of the rectifier diode D22 should be connected to the node N2 (output terminal VOUT).

As described above, the second embodiment of the present invention, i.e. the synchronous rectification step-up type DC/DC converter 2 is different from the synchronous rectification step-down type DC/DC converter 1 shown in FIG. 1. Other circuit portions are the same as those of FIG. 1, and hence description thereof is omitted. Also in the DC/DC converter 2, the oscillator 9 including the constant current source CC and the linear current source CL is used. Note that the step-down type is exemplified in the first embodiment of the present invention, and the step-up type is exemplified in the second embodiment, but it is needless to say that the present invention can be applied to a so-called step-up/down type DC/DC converter in which the step-down type and the step-up type are switched.

Figure 4:
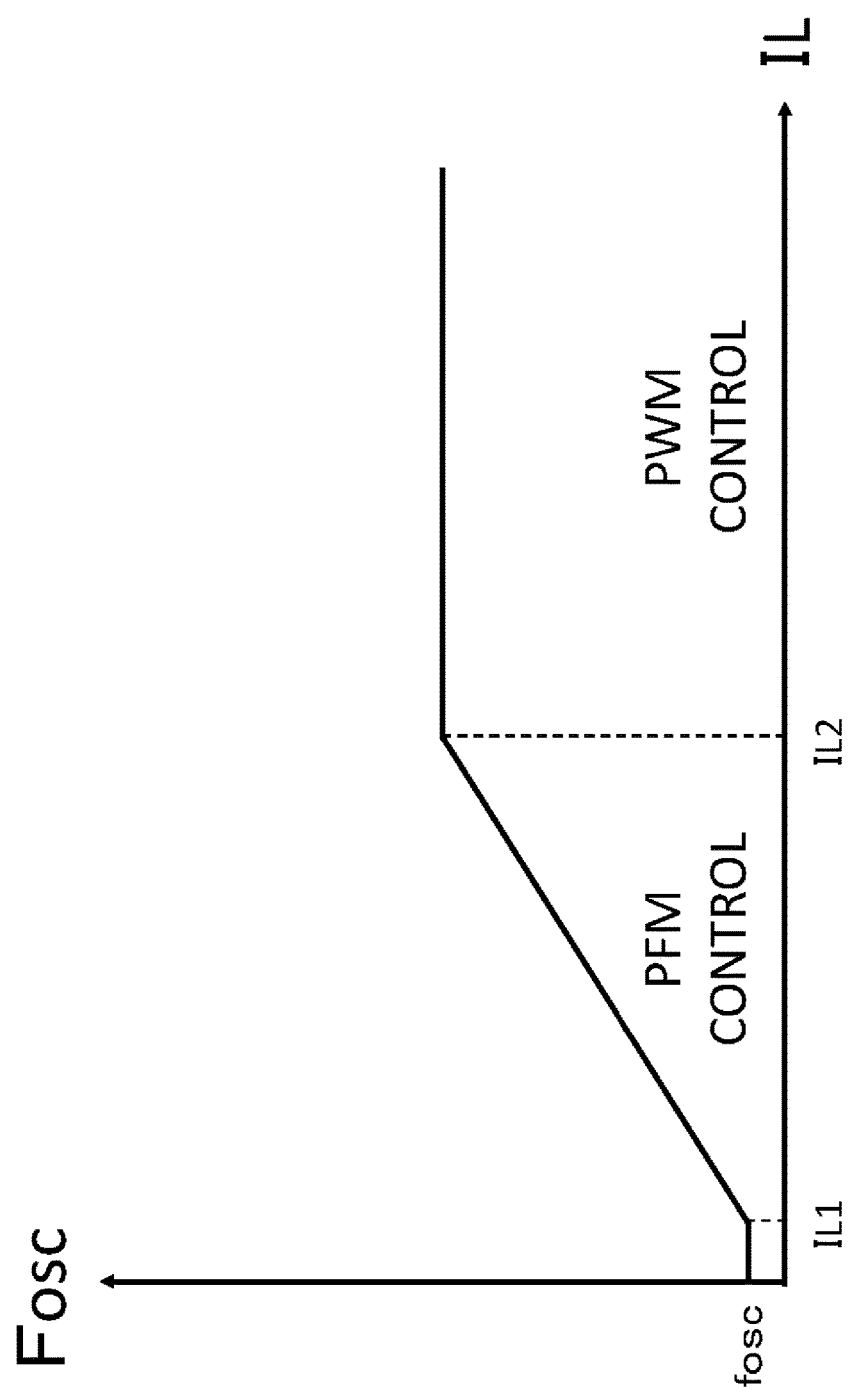
FIG. 4 is a diagram showing a relationship between oscillation frequency Fosc of the oscillator and load current IL in FIGS. 1 and 2.

FIG. 4 is a diagram showing a manner in which the oscillation frequency Fosc of the clock signal CLK of the oscillator 9 changes responding to the load current IL flowing in the load RL in each of the DC/DC converter 1 of FIG. 1 and the DC/DC converter 2 of FIG. 3. When the load current IL is relatively small from IL1 to IL2, the control by frequency modulation (PFM) is performed, in which the oscillation frequency Fosc changes according to the load current IL. On the other hand, when the load current IL becomes larger than IL2, the control is switched to the pulse width modulation (PWM), in which the oscillation frequency Fosc is fixed. When the load current IL becomes smaller than IL1, the oscillation frequency Fosc is maintained at fosc(a), and the constant current Icc and the linear current Icl of the oscillator 9 shown in FIGS. 1 and 2 are controlled so that the oscillation frequency Fosc does not become smaller than fosc(a). Note that the oscillation frequency fosc(a) is set to the upper limit of the audible frequency band (e.g. approximately 20 KHz).

In this way, when the load current IL (or the output detection current Isense) is larger than a predetermined value IL2, the oscillator 9 sets the oscillation frequency Fosc of the rectangular wave signal CLK to a fixed value. When the load current IL (or the output detection current Isense) is smaller than the predetermined value IL2, the oscillation frequency of the rectangular wave signal CLK is reduced more from the fixed value as the load current IL (or the output detection current Isense) becomes smaller.

Figure 5:
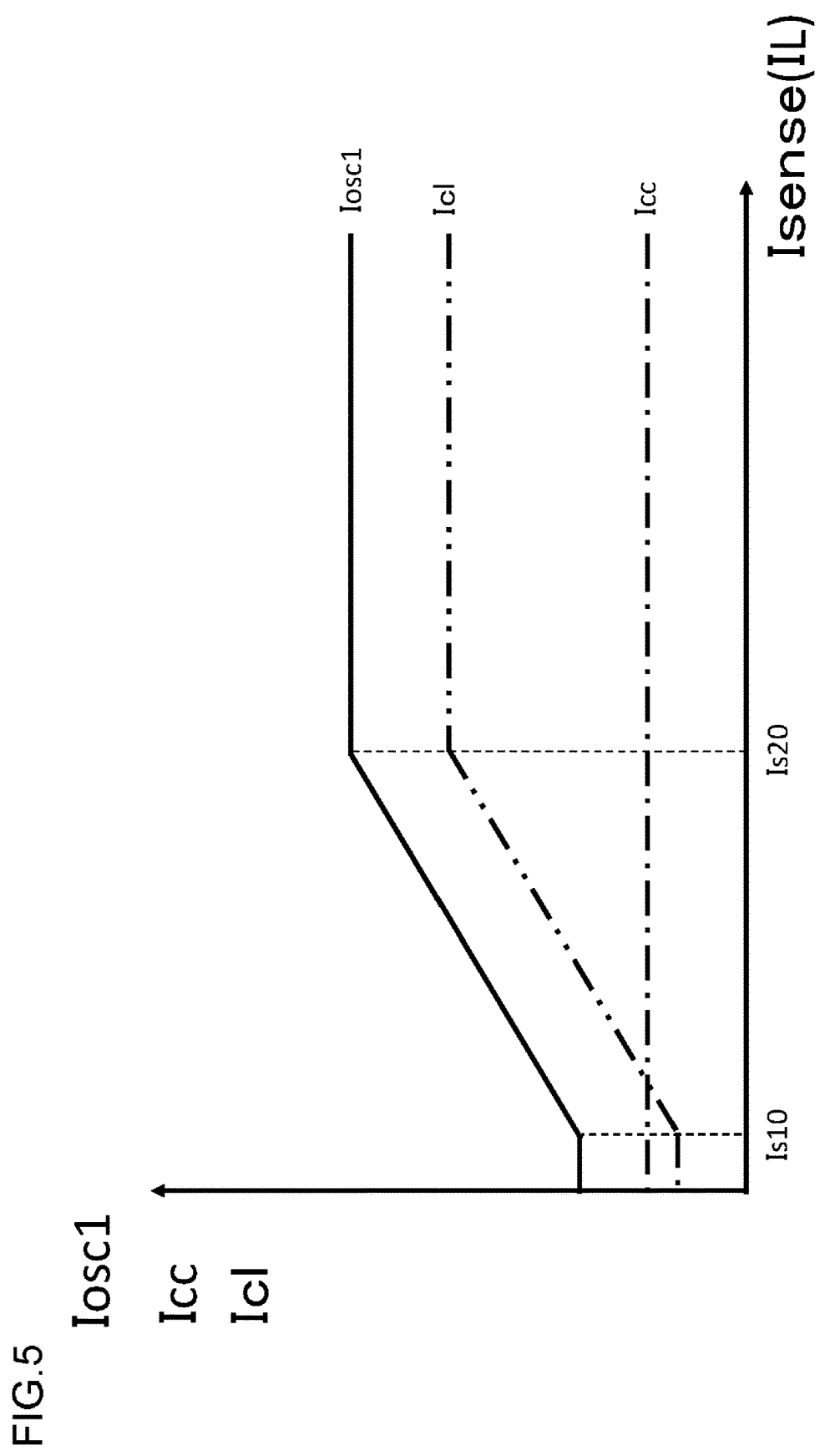
FIG. 5 is a diagram showing a case where oscillator current Iosc1 generated corresponding to a variation in output detection current Isense is determined as the sum of constant current Icc and linear current Icl in FIGS. 1 and 2.

FIG. 5 is a diagram showing a relationship between the output detection current Isense and each of the constant current Icc, the linear current Icl, and the oscillator current Iosc1 set by the oscillator 9, in each of the DC/DC converter 1 of FIG. 1 and the DC/DC converter 2 of FIG. 3. Note that the output detection current Isense has a current value proportional to the load current IL. FIG. 5 shows a case where the oscillator current Iosc1 is determined by the sum (+) of the constant current Icc and the linear current Icl.

In FIG. 5, the constant current Icc does not respond to the output detection current Isense but is maintained at a constant value. In contrast, the linear current Icl is increased or decreased in proportion to the output detection current Isense in the period while the output detection current Isense is Is10 to Is20, but it is maintained at a constant value after the output detection current Isense becomes larger than Is20. As a result, the oscillator current Iosc1 set as the sum of them responds to the linear current Icl. The control of the oscillator current Iosc1 becomes a basis of control of the oscillation frequency Fosc of the clock signal CLK generated by the oscillator 9, therefore of switching between the PFM control and the PWM control. Note that when the output detection current Isense is smaller than Is10, the oscillator current Iosc1 is fixed to a predetermined value. In this way, the oscillation frequency Fosc of the clock signal CLK generated by the oscillator 9 is prevented from being decreased. In any case, when entering the PFM control, the linear current Icl becomes dominant in control of the oscillation frequency Fosc.

Figure 6:
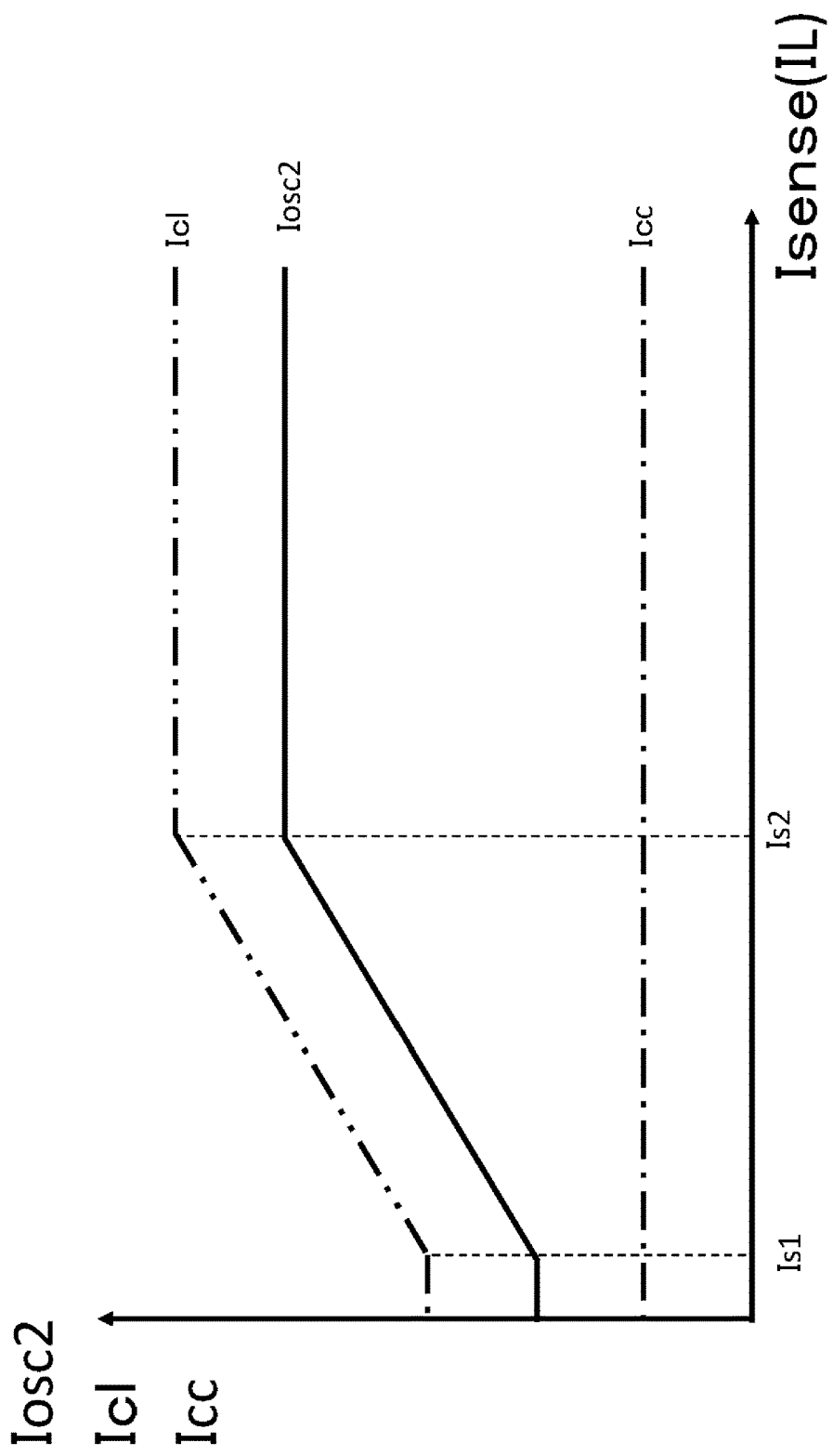
FIG. 6 is a diagram showing a case where oscillator current Iosc2 generated corresponding to a variation in the output detection current Isense is determined as a difference between the linear current Icl and the constant current Icc in FIGS. 1 and 2.

FIG. 6 is a diagram showing a relationship between the output detection current Isense and each of the constant current Icc, the linear current Icl, and the oscillator current Iosc2 set by the oscillator 9, in each of the DC/DC converter 1 of FIG. 1 and the DC/DC converter 2 of FIG. 3. Note that the output detection current Isense has a value proportional to the load current IL. FIG. 6 shows a case where the oscillator current Iosc2 is determined as a difference (−) between the constant current Icc and the linear current Icl.

In FIG. 6, the constant current Icc does not respond to the output detection current Isense but is maintained at a constant value. This shows the same characteristics as in FIG. 5. In contrast, the linear current Icl is increased or decreased in proportion to the output detection current Isense in the period where the output detection current Isense is Is1 to Is2, but is maintained at a constant value after the output detection current Isense becomes larger than Is2. This characteristic is also the same as that in FIG. 5. As a result, the oscillator current Iosc2 determined as a difference between them responds to the linear current Icl. Note that the constant current Icc is subtracted from the linear current Icl in FIG. 6, but it is possible to adopt a structure in which the linear current Icl is subtracted from the constant current Icc. In this case, the circuit of the oscillator 9 is constituted so that the linear current Icl becomes smaller as the output detection current Isense becomes larger from Is1 to Is2.

Figure 7:
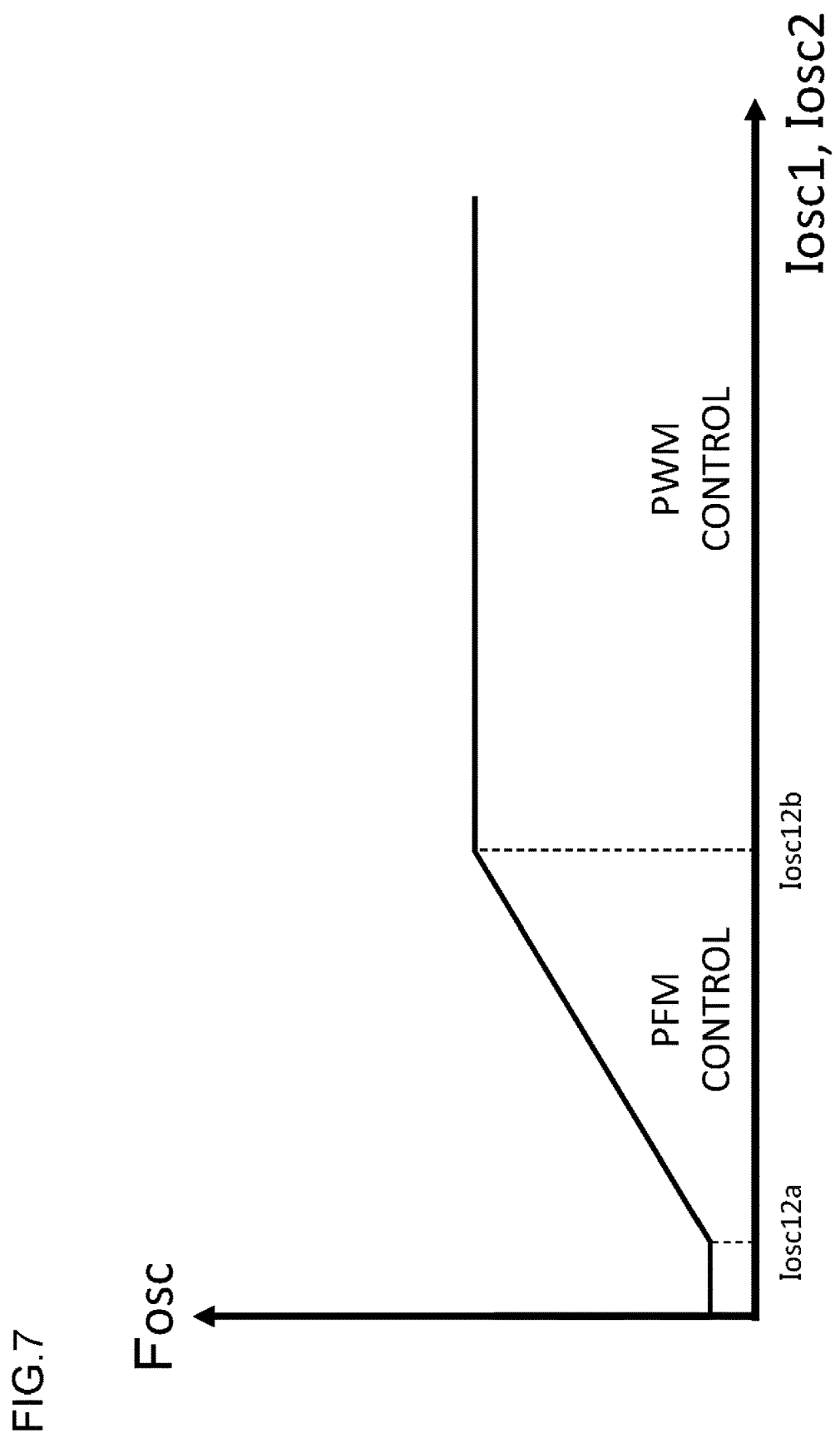
FIG. 7 is a diagram showing a relationship between oscillator current Iosc1, Iosc2 and the oscillation frequency Fosc of a clock signal CLK generated in an oscillator 9 in FIGS. 1 and 2.

FIG. 7 is a diagram showing a relationship between the oscillation frequency Fosc of the clock signal CLK generated by the oscillator 9 and each of the oscillator current Iosc1 and Iosc2 shown in FIGS. 5 and 6. Note that FIG. 7 is substantially the same as FIG. 4. In other words, FIG. 4 shows a manner in which a variation of the oscillation frequency Fosc depends on the load current IL, but FIG. 7 shows a manner in which the oscillation frequency Fosc is controlled depending on the oscillator current Iosc1, Iosc2. Note that the PFM control is performed in the period while the oscillator current Iosc1, Iosc2 is from Iosc12a to Iosc12b. On the other hand, after the oscillator current Iosc1, Iosc2 becomes larger than Iosc12b, the PWM control is performed.

<Oscillator Portion>

Figure 8:
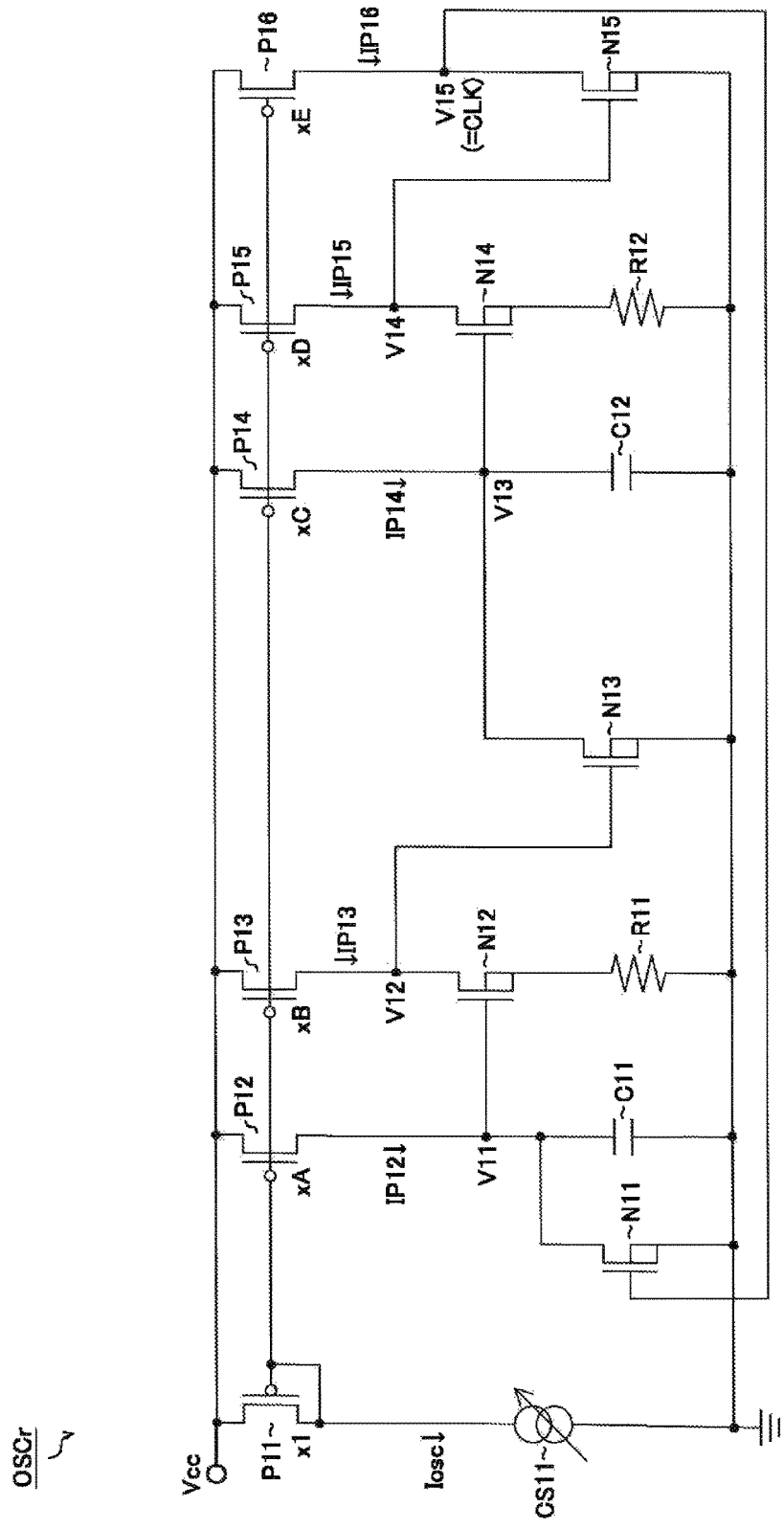
FIG. 8 is a diagram showing a structural example of an oscillator portion OSCr.

FIG. 8 is a diagram showing a structural example of the oscillator portion OSCr. The oscillator portion OSCr of this diagram includes P-channel MOS field effect transistors P11 to P16, N-channel MOS field effect transistors N11 to N15, capacitors C11 and C12, and resistors R11 and R12, and it is one type of CR oscillator, which uses oscillator current Iosc generated by a current source CS11 for periodically repeating charge and discharge of the capacitors C11 and C12, so as to generate the rectangular wave signal CLK of the oscillation frequency Fosc.

Note that the current source CS11 corresponds to the constant current source CC and the linear current source CL described above, and the oscillator current Iosc corresponds to the oscillator current Iosc1 or Iosc2 described above. The structure and operation of the current source CS11 will be described later in detail.

The source of each of the transistors P11 to P16 is connected to an application terminal of the power supply voltage Vcc. The gate of each of the transistors P11 to P16 is connected to the drain of the transistor P11. The drain of the transistor P11 is connected to a first terminal of the current source CS11 (i.e. the output terminal of the oscillator current Iosc).

In this way, the transistors P11 to P16 respectively duplicate the oscillator current Iosc flowing in the drain of the transistor P11 at predetermined mirror ratios A to E (e.g. A=4, B=4, C=2, D=4, and E=1), so as to generate a plurality of (five in this diagram) mirror current IP12 to IP16, and thus a current mirror circuit is formed.

The drain of the transistor P12 is connected to a first terminal of the capacitor C11, the drain of the transistor N11, and the gate of the transistor N12. The drain of the transistor P13 is connected to the drain of the transistor N12 and the gate of the transistor N13. The drain of the transistor P14 is connected to a first terminal of the capacitor C12, the drain of the transistor N13, and the gate of the transistor N14. The drain of the transistor P15 is connected to the drain of the transistor N14 and the gate of the transistor N15. The drain of the transistor P16 is connected to the drain of the transistor N15 and the gate of the transistor N11.

The source of the transistor N12 is connected to a first terminal of the resistor R11. The source of the transistor N14 is connected to a first terminal of the resistor R12. A second terminal of the current source CS11, the source of the transistor N11, a second terminal of the capacitor C11, a second terminal of the resistor R11, the source of the transistor N13, a second terminal of the capacitor C12, a second terminal of the resistor R12, and a second terminal of the transistor N15 are all connected to the ground terminal.

Figure 9:
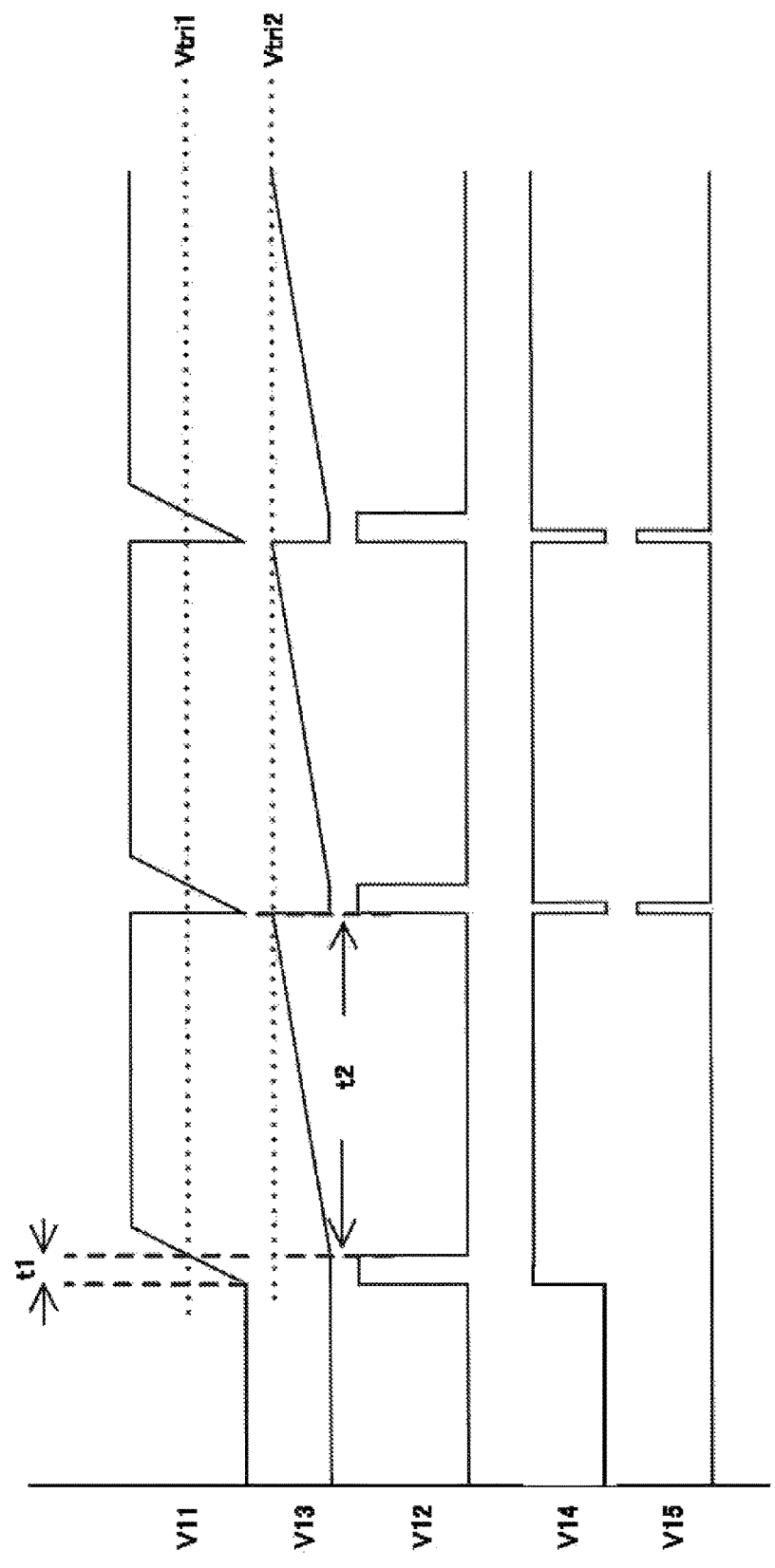
FIG. 9 is a timing chart illustrating an operation of the oscillator portion OSCr.

FIG. 9 is a timing chart showing an operation of the oscillator portion OSCr, in which a node voltage V11, a node voltage V13, a node voltage V12, a node voltage V14, and a node voltage V15 are shown in order from the top.

Note that the node voltage V11 is a gate voltage of the transistor N12. The node voltage V12 is a gate voltage of the transistor N13. The node voltage V13 is a gate voltage of the transistor N14. The node voltage V14 is a gate voltage of the transistor N15. The node voltage V15 is a gate voltage of the transistor N11, and for example, this node voltage V15 is output as the rectangular wave signal CLK. Before the power supply voltage Vcc is supplied to the oscillator portion OSCr, the node voltages V11 to V15 are all low level.

When the power supply voltage Vcc is supplied to the oscillator portion OSCr, charging of the capacitor C11 with the mirror current IP12 is started, and hence the node voltage V11 starts to increase. However, when the node voltage V11 is lower than a threshold value voltage Vtri1 (=VGS(N12)+ R11×IP13, where VGS(N12) is an on-threshold voltage of the transistor N12), the transistor N12 is not turned on. As a result, the node voltage V12 becomes high level, and the transistor N13 is turned on. When the transistor N13 is turned on, both terminals of the capacitor C12 are short-circuited, and hence the node voltage V13 becomes low level so that the transistor N14 is turned off. Therefore, the node voltage V14 becomes high level so that the transistor N15 is turned on, and hence the node voltage V15 becomes low level so that the transistor N11 is turned off. When the transistor N11 is turned off, both terminals of the capacitor C11 are opened, and hence charging of the capacitor C11 is continued.

After that, when the node voltage V11 is increased to be higher than the threshold value voltage Vtri1, the transistor N12 is turned on, and hence the node voltage V12 becomes low level so that the transistor N13 is turned off. When the transistor N13 is turned off, both terminals of the capacitor C12 are opened so that charging of the capacitor C12 with the mirror current IP14 is started, and hence the node voltage V13 starts to increase. However, when the node voltage V13 is lower than a threshold value voltage Vtri2 (=VGS(N14)+ R12×IP15, where VGS(N14) is an on-threshold voltage of the transistor N14), the transistor N14 is not turned on. As a result, the node voltage V14 is maintained at high level, and hence the transistor N15 is maintained to be turned on. Therefore, the node voltage V15 is maintained at low level, and hence the transistor N11 is maintained to be turned off. As described above, when the transistor N11 is turned off, both terminals of the capacitor C11 are opened, and hence charging of capacitor C11 is continued.

Note that time t1 necessary for the node voltage V11 to become higher than the threshold value voltage Vtri1 after starting to increase can be expressed by t1=C11×Vtri1/IP12. In other words, as the mirror or current IP12 (therefore the oscillator current Iosc) is larger, the time t1 is shorter.

After that, when the node voltage V13 increases to be higher than the threshold value voltage Vtri2, the transistor N14 is turned on, the node voltage V14 becomes low level, and the transistor N15 is turned off. Therefore, the node voltage V15 becomes high level. As a result, the transistor N11 is turned on, and both terminals of the capacitor C11 are short-circuited. Then, the node voltage V11 becomes low level so that the transistor N12 is turned off, and hence the node voltage V12 becomes high level so that the transistor N13 is turned on. Then, both terminals of the capacitor C12 are short-circuited so that the node voltage V13 becomes low level, and hence the transistor N14 is turned off again. Therefore, the node voltage V14 is increased to high level so that the transistor N15 is turned on, and hence the node voltage V15 is decreased to low level so that the transistor N11 is turned off.

Note that time t2 necessary for the node voltage V12 to become higher than the threshold value voltage Vtri2 after starting to increase can be expressed by t2=C12×Vtri2/IP14. In other words, as the mirror current IP14 (therefore the oscillator current Iosc) is larger, the time t2 is shorter.

By repeating the series of operations described above, the rectangular wave signal CLK (i.e. the node voltage V15) of the oscillation frequency Fosc (=1/(t1+t2)) can be generated. Note that as the oscillator current Iosc is larger, the time t1 and the time t2 are shorter, and hence the oscillation frequency Fosc is higher. On the contrary, as the oscillator current Iosc is smaller, the time t1 and the time t2 are longer, and hence the oscillation frequency Fosc is lower.

<Current Source>

Figure 10:
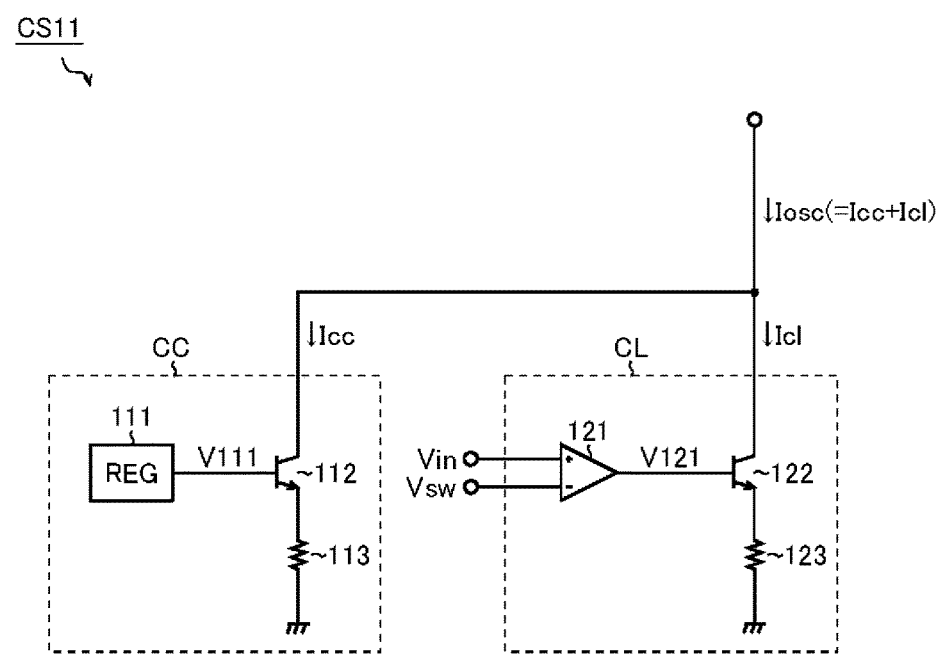
FIG. 10 is a diagram showing a first structural example of a current source CS11.

FIG. 10 is a diagram showing a first structural example of the current source CS11. The current source CS11 of the first structural example includes the constant current source CC that generates the constant current Icc, and the linear current source CL that generates the linear current Icl.

The constant current source CC includes a constant voltage source 111, an NPN bipolar transistor 112, and a resistor 113.

The constant voltage source 111 is a circuit portion that generates a constant voltage V111, and a band gap reference voltage source or the like can be appropriately used for it.

The transistor 112 and the resistor 113 function as a voltage-current converter portion that converts the constant voltage V111 into the constant current Icc. Connection relationship is specifically described below. The base of the transistor 112 is connected to the output terminal of the constant voltage source 111 (i.e. an application terminal of the constant voltage V111). The emitter of the transistor 112 is connected to a first terminal of the resistor 113. A second terminal of the resistor 113 is connected to the ground terminal. The collector of the transistor 112 corresponds to the output terminal of the constant current Icc.

The linear current source CL includes a voltage output type differential amplifier 121, an NPN bipolar transistor 122, and a resistor 123.

The differential amplifier 121 generates a linear voltage V121, which corresponds to a difference between the input voltage Vin input to a noninverting input terminal (+) and the switch voltage Vsw input to an inverting input terminal (−) (i.e. a voltage between both ends of the switching element T11 in the on period). Note that as the output detection current Isense flowing in the on period of the switching element T11 is larger, the switch voltage Vsw becomes lower, and hence the linear voltage V121 becomes higher. In this way, not only in the current mode control but also in the variable control of the oscillation frequency Fosc, with the structure utilizing the switch voltage Vsw, the output current detecting portion 4 can be eliminated (the slope voltage generating circuit 11 and the linear current source CL can share the output detecting portion 4), and hence the circuit scale of the DC/DC converter 1 can be reduced.

The transistor 122 and the resistor 123 function as a voltage-current converter portion that converts the linear voltage V121 into the linear current Icl. Connection relationship is specifically described below. The base of the transistor 122 is connected to the output terminal of the differential amplifier 121 (i.e. an application terminal of the linear voltage V121). The emitter of the transistor 122 is connected to a first terminal of the resistor 123. A second terminal of the resistor 123 is connected to the ground terminal. The collector of the transistor 122 corresponds to the output terminal of the linear current Icl. The linear current Icl varies in proportion to the linear voltage V121 (therefore the output detection current Isense).

Note that in the current source CS11 of this structural example, the collectors of the transistors 112 and 122 are commonly connected to the output terminal of the oscillator current Iosc. Therefore, it is possible to generate oscillator current Iosc (=Icc+Icl), which is the sum of the constant current Icc and the linear current Icl. This oscillator current Iosc corresponds to the oscillator current Iosc1 in FIG. 5.

Figure 11:
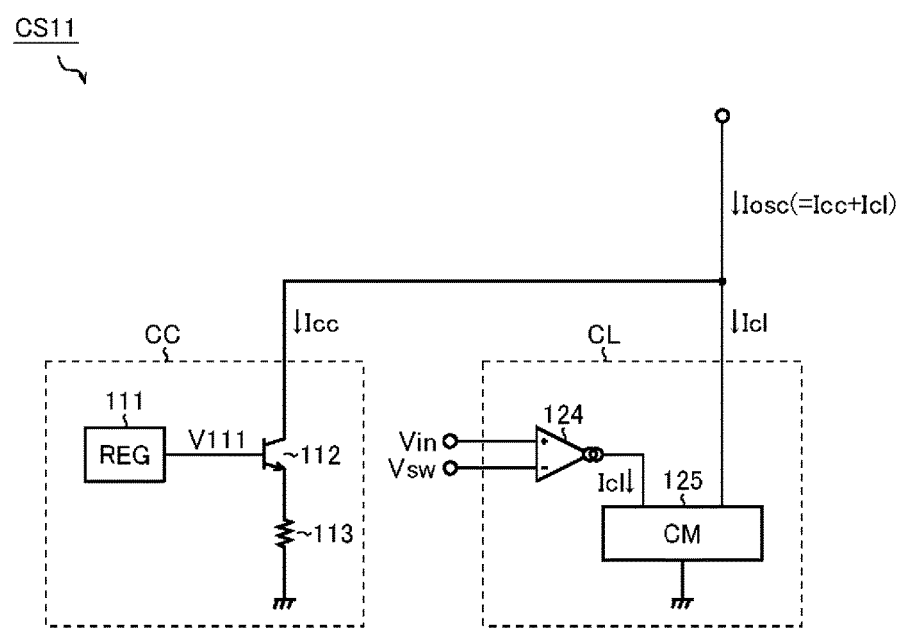
FIG. 11 is a diagram showing a second structural example of the current source CS11.

FIG. 11 is a diagram showing a second structural example of the current source CS11. The current source CS11 of the second structural example is based on the first structural example (FIG. 10), in which the structure of the linear current source CL is modified. Accordingly, the same structural element as in the first structural example is denoted by the same numeral as in FIG. 10 so that overlapping description is omitted. In the following description, characteristic portions of the second structural example are mainly described.

Unlike the first structural example (FIG. 10) described above, the linear current source CL includes a current output type differential amplifier 124 and a current mirror circuit 125.

The differential amplifier 124 directly generates the linear current Icl corresponding to a difference between the input voltage Vin input to the noninverting input terminal (+) and the switch voltage Vsw input to the inverting input terminal (−) (i.e. a voltage between both ends in the on period of the switching element T11). Note that as the output detection current Isense flowing in the on period of the switching element T11 is larger, the linear current Icl1 becomes larger in proportion to the same. In this way, not only in the current mode control but also in the variable control of the oscillation frequency Fosc, with the structure utilizing the switch voltage Vsw, the output current detecting portion 4 can be eliminated, and hence the circuit scale of the DC/DC converter 1 can be reduced. This point is similar to the first structural example (FIG. 10) described above.

The current mirror circuit 125 is connected between the output terminal of the differential amplifier 124 and the ground terminal, so that the direction of the linear current Icl is folded. More specifically, the current mirror circuit 125 mirrors the linear current Icl flowing into itself so as to draw in the linear current Icl from the output terminal of the oscillator current Iosc.

Note that in the current source CS11 of this structural example, the collector of the transistor 112 and the output terminal of the current mirror circuit 125 are commonly connected to the output terminal of the oscillator current Iosc. Therefore, it is possible to generate the oscillator current Iosc (=Icc−Icl), which is the sum of the constant current Icc and the linear current Icl. This oscillator current Iosc corresponds to the oscillator current Iosc1 in FIG. 5. This point is similar to the first structural example (FIG. 10) described above.

Figure 12:
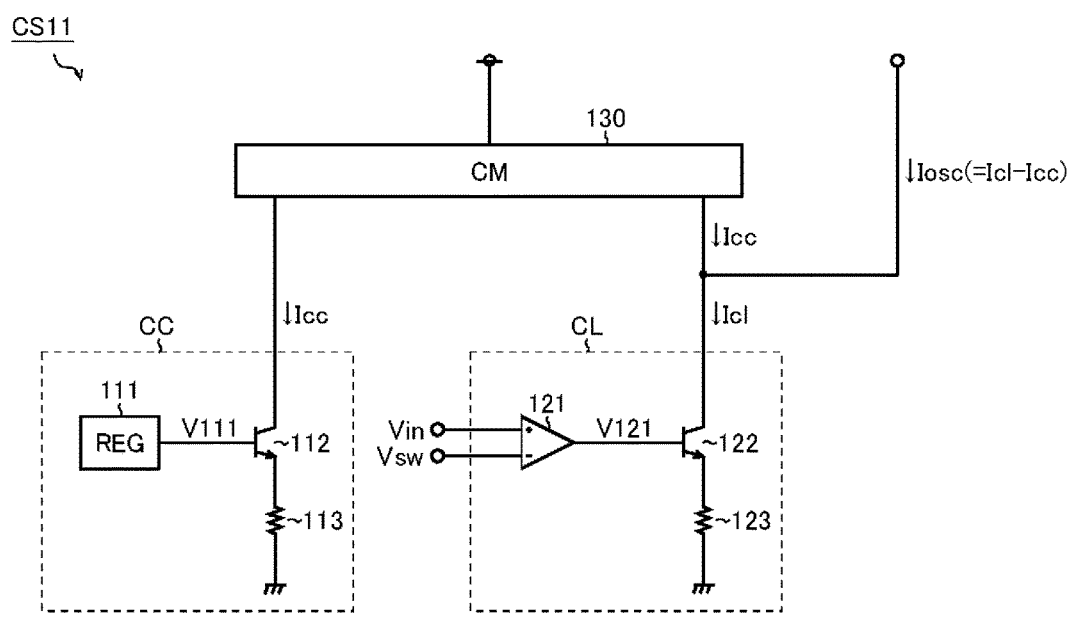
FIG. 12 is a diagram showing a third structural example of the current source CS11.

FIG. 12 is a diagram showing a third structural example of the current source CS11. The current source CS11 of the third structural example is based on the first structural example (FIG. 10), to which a current mirror circuit 130 is added. Accordingly, the same structural element as in the first structural example is denoted by the same numeral as in FIG. 10 so that overlapping description is omitted. In the following description, characteristic portions of the third structural example are mainly described.

The current mirror circuit 130 is connected between the output terminal of the constant current source CC and the power supply terminal, so that the direction of the constant current Icc is folded. More specifically, the current mirror circuit 130 mirrors the constant current Icc drawn into the constant current source CC so as to flow the linear current Icl into the output terminal of the oscillator current Iosc.

Note that in the current source CS11 of this structural example, the collector of the transistor 122 and the output terminal of the current mirror circuit 130 are commonly connected to the output terminal of the oscillator current Iosc. Therefore, it is possible to generate the oscillator current Iosc (=Icl−Icc), which is obtained by subtracting the constant current Icc from the linear current Icl. This oscillator current Iosc corresponds to the oscillator current Iosc2 of FIG. 6.

Figure 13:
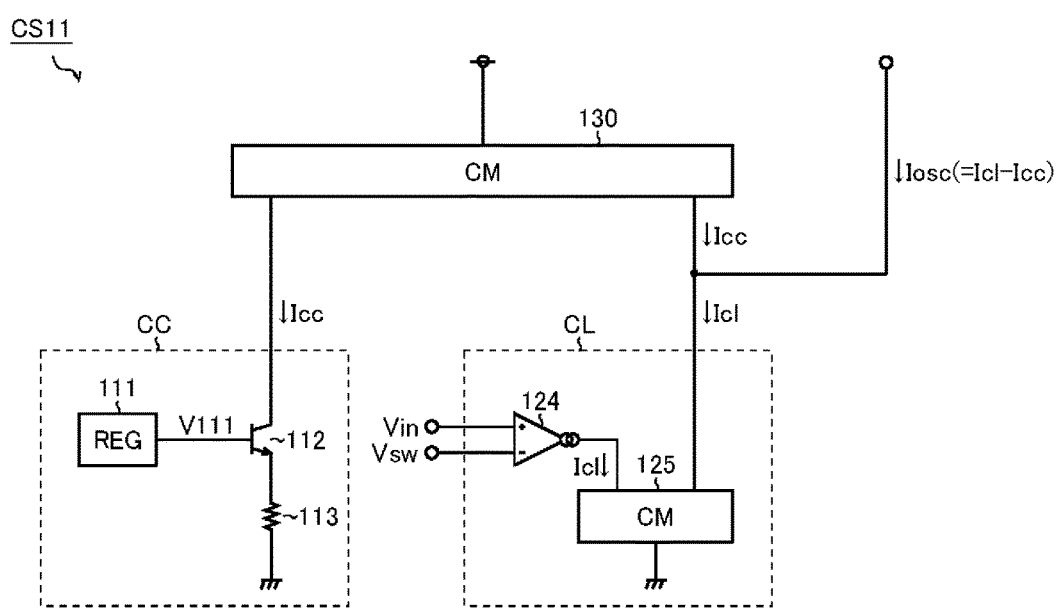
FIG. 13 is a diagram showing a fourth structural example of the current source CS11.

FIG. 13 is a diagram showing a fourth structural example of the current source CS11. The current source CS11 of the fourth structural example is based on the third structural example (FIG. 12), in which the linear current source CL similar to that of the second structural example (FIG. 11) is used. With this modification too, it is possible to generate the oscillator current Iosc (=Icl−Icc) obtained by subtracting the constant current Icc from the linear current Icl. This point is similar to the third structural example (FIG. 12) described above.

Note that in the oscillator 9, it is desired to use a current mirror circuit as means for generating each of the constant current Icc and the linear current Icl, adding them, subtracting them, and setting a current ratio between them, as described above.

SUMMARY

Hereinafter, various embodiments disclosed in this specification are summarized.

The DC/DC converter (1, 2) disclosed in this specification includes the switching element (T11, T21) connected to the input voltage (Vin) so as to be turned on and off, the driving circuit (3) arranged to perform ON/OFF control of the switching element (T11, T21), the inductor (L1, L2) arranged to flow current controlled by the switching element (T11, T21), the smoothing capacitor (C1, C2) connected to the inductor (L1, L2) so as to perform rectifying operation together with the inductor (L1, L2), the oscillator (9) arranged to generate the rectangular wave signal (CLK) for operating the driving circuit (3), and the output current detecting portion (4) arranged to detect the output detection current (Isense) flowing in the switching element (T11, T21) or the inductor (L1, L2). When the output detection current (Isense) is a predetermined value or larger, the oscillator (9) generates the rectangular wave signal (CLK) at a fixed oscillation frequency. When the output detection current (Isense) is smaller than the predetermined value, the oscillator (9) generates the rectangular wave signal (CLK) at an oscillation frequency (Fosc) lower than the fixed oscillation frequency and proportional to the output detection current (Isense).

In addition, in the DC/DC converter (1, 2), the oscillator (9) includes the constant current source (CC) that generates the constant current (Icc) regardless of the output detection current (Isense), and the linear current source (CL) that generates the linear current (Icl) responding to the output detection current (Isense).

In addition, in the DC/DC converter (1, 2), the oscillation frequency (Fosc) of the oscillator (9) is set based on the oscillator current (Iosc1, Iosc2) set by the sum (+) of the constant current (Icc) and the linear current (Icl) or a difference (−) between them.

In addition, when the output detection current (Isense) is a predetermined value or larger, the DC/DC converter (1, 2) performs the PWM control. When the output detection current is smaller than the predetermined value, the DC/DC converter (1, 2) performs the PFM control.

In addition, when the PFM control is performed in the DC/DC converter (1, 2), setting of the oscillation frequency (Fosc) of the oscillator (9) is controlled by the linear current (Id).

In addition, when the PFM control is performed in the DC/DC converter (1, 2), the minimum value of the oscillation frequency (Fosc) is set to be above the audible frequency band.

In addition, the DC/DC converter (1, 2) further includes the error amplifier (7) arranged to compare the feedback voltage (Vfb) generated based on the voltage generated at the smoothing capacitor (C1, C2) with the reference voltage (Vref) having a predetermined value so as to output a difference between the both voltages as the error signal (Verr). In addition, DC/DC converter (1, 2) includes the slope voltage generating circuit (11) arranged to generate the slope signal (Vsl) based on the rectangular wave signal generated by the oscillator (9), and the PWM comparator (10) arranged to output a signal of a comparison result between the error signal (Verr) and the slope signal (Vsl) to the driving circuit (3).

In addition, the DC/DC converter (1, 2) is a current mode type in which a voltage component corresponding to the output detection current (Isense) is superimposed on the slope signal (Vsl).

In addition, the DC/DC converter (1, 2) includes the rectifier element (T12, D12, T22, D22) connected to the common node (N1) with the switching element (T11, T21) and the inductor (L1, L2), so as to supply current to the inductor (L1, L2) when the switching element (T11, T21) is turned off.

In addition, the DC/DC converter (1, 2) includes the reverse current detection circuit (5) arranged to detect reverse current flowing from the ground potential (GND) to the common node (N1). When the reverse current detection circuit (5) detects a predetermined reverse current, the DC/DC converter (1, 2) turns off the rectifier element (T12) or the switching element (T21) connected to the ground potential (GND).

With the DC/DC converter having the structure described above, the load current is detected, and when the load current becomes smaller than a predetermined value, the switching driving method of the DC/DC converter is switched from the PWM control to the PFM control, and further the control is automatically performed so that the oscillation frequency is decreased in proportion to the load current. Thus, power efficiency in light load with small load current or in no-load can be prevented from being lowered.

INDUSTRIAL APPLICABILITY

As described above, the DC/DC converter disclosed in this specification adjusts the oscillation frequency of the oscillator based on the output detection current proportional to the load current, and hence switching between the PWM control and the PFM control can be smoothly performed. In this way, the present invention can be applied various DC/DC converters in wide range regardless of a difference between the voltage mode type and the current mode type, or a difference among the step-down type, the step-up type and the step-up/down type, and has high industrial applicability.

What is claimed is:

1. A DC/DC converter comprising:
   a switching element connected to an input voltage so as to be turned on and off;
   a driving circuit arranged to perform ON/OFF control of the switching element;
   an inductor arranged to flow a current controlled by the switching element;
   a smoothing capacitor connected to the inductor so as to perform rectifying operation together with the inductor;
   an oscillator arranged to generate a rectangular wave signal for operating the driving circuit; and
   an output current detecting portion arranged to detect an output detection current flowing in the switching element or the inductor, wherein
   the oscillator generates the rectangular wave signal at a fixed oscillation frequency when the output detection current is a predetermined value or larger, whereas the oscillator generates the rectangular wave signal at an oscillation frequency lower than the fixed oscillation frequency and proportional to the output detection current when the output detection current is smaller than the predetermined value, wherein
   the oscillator includes a constant current source arranged to generate a constant current regardless of the output detection current, and a linear current source arranged to generate a linear current responding to the output detection current, and
   the linear current is fixed to a first current value when the output detection current is smaller than a first threshold value, and the linear current is variably controlled from the first current value to a second current value responding to the output detection current when the output detection current is larger than the first threshold value and smaller than a second threshold value, and the linear current is fixed to the second current value when the output detection current is larger than the second threshold value.

2. The DC/DC converter according to claim 1, wherein an oscillation frequency of the oscillator is set based on an oscillator current corresponding to the sum of the constant current and the linear current or a difference between them.

3. The DC/DC converter according to claim 1, wherein a PWM control is performed when the output detection current is a predetermined value or larger, and a PFM control is performed when the output detection current is smaller than the predetermined value.

4. The DC/DC converter according to claim 3, wherein setting of an oscillation frequency of the oscillator is controlled by the linear current when the PFM control is performed.

5. The DC/DC converter according to claim 3, wherein a minimum value of the oscillation frequency of the oscillator is above an audible frequency band when the PFM control is performed.

6. The DC/DC converter according to claim 1, further comprising:
   an error amplifier arranged to compare a feedback voltage generated based on a voltage generated at the smoothing capacitor with a reference voltage having a predetermined value so as to output a difference between the both voltages as an error signal;
   a slope voltage generating circuit arranged to generate a slope signal based on a rectangular wave signal generated by the oscillator; and
   a PWM comparator arranged to output a signal of a comparison result between the error signal and the slope signal.

7. The DC/DC converter according to claim 6, wherein a voltage component corresponding to the output detection current is superimposed on the slope signal.

8. The DC/DC converter according to claim 1, further comprising a rectifier element connected to a common node with the switching element and the inductor so as to supply current to the inductor when the switching element is turned off.

9. The DC/DC converter according to claim 8, further comprising a reverse current detection circuit arranged to detect reverse current flowing from a ground potential to the common node, wherein when the reverse current detection circuit detects a predetermined reverse current, operation of the rectifier element or the switching element connected to the ground potential is turned off.

10. The DC/DC converter according to claim 6, wherein the error amplifier is a transconductance type.

11. The DC/DC converter according to claim 1, which is a current mode type or a voltage mode type.

12. The DC/DC converter according to claim 1, which is one of a step-down type, a step-up type, or a step-up/down type.

13. The DC/DC converter according to claim 2, wherein the oscillator further includes an oscillator portion arranged to repeat charging and discharging of a capacitor using the oscillator current so as to generate the rectangular wave signal.

14. The DC/DC converter according to claim 2, wherein the constant current source includes a constant voltage source arranged to generate a constant voltage and a voltage-current converter portion arranged to convert the constant voltage into the constant current.

15. The DC/DC converter according to claim 2, wherein the linear current source includes a voltage output type differential amplifier arranged to generate a linear voltage corresponding to a voltage between both terminals of the switching element, and a voltage-current converter portion arranged to convert the linear voltage into the linear current.

16. The DC/DC converter according to claim 2, wherein the linear current source includes a current output type differential amplifier arranged to generate the linear current corresponding to a voltage between both terminals of the switching element.

17. The DC/DC converter according to claim 2, wherein the oscillator includes a current mirror circuit, which is used for generating each of the constant current and the linear current, adding them, subtracting them, and setting a current ratio between them.

18. A power supply controller comprising:
an oscillator arranged to generate a rectangular wave signal; and
a driving circuit arranged to drive a switching output stage of a DC/DC converter in synchronization with the rectangular wave signal, wherein
the oscillator is operable to set an oscillation frequency of the rectangular wave signal to a fixed value when an output detection current flowing in the switching output stage is larger than a predetermined value, and the oscillator is operable to decrease the oscillation frequency of the rectangular wave signal from the fixed value more as the output detection current becomes smaller when the output detection current is smaller than the predetermined value, wherein
the oscillator includes a constant current source arranged to generate a constant current regardless of the output detection current, and a linear current source arranged to generate a linear current responding to the output detection current, and
the linear current is fixed to a first current value when the output detection current is smaller than a first threshold value, and the linear current is variably controlled from the first current value to a second current value responding to the output detection current when the output detection current is larger than the first threshold value and smaller than a second threshold value, and the linear current is fixed to the second current value when the output detection current is larger than the second threshold value.

19. A DC/DC converter comprising:
a switching element connected to an input voltage so as to be turned on and off;
a driving circuit arranged to perform ON/OFF control of the switching element;
an inductor arranged to flow a current controlled by the switching element;
a smoothing capacitor connected to the inductor so as to perform a rectifying operation together with the inductor;
an oscillator arranged to generate a rectangular wave signal for operating the driving circuit; and
an output current detecting portion arranged to detect an output detection current flowing in the switching element or the inductor, wherein
the oscillator generates the rectangular wave signal at a fixed oscillation frequency when the output detection current is a predetermined value or larger, whereas the oscillator generates the rectangular wave signal at an oscillation frequency lower than the fixed oscillation frequency and proportional to the output detection current when the output detection current is smaller than the predetermined value, wherein
the oscillator includes a constant current source arranged to generate a constant current regardless of the output detection current, and a linear current source arranged to generate a linear current responding to the output detection current, wherein
the oscillation frequency of the oscillator is set based on oscillator current corresponding to the sum of the constant current and the linear current or a difference between them, wherein
the linear current source includes a voltage output type differential amplifier arranged to generate a linear voltage corresponding to a voltage between both terminals of the switching element, and a voltage-current converter portion arranged to convert the linear voltage into the linear current.

20. The DC/DC converter according to claim 19, wherein the linear current is fixed to a first current value when the output detection current is smaller than a first threshold value, and the linear current is variably controlled from the first current value to a second current value responding to the output detection current when the output detection current is larger than the first threshold value and smaller than a second threshold value, and the linear current is fixed to the second current value when the output detection current is larger than the second threshold value.

21. The DC/DC converter according to claim 19, wherein a PWM control is performed when the output detection current is a predetermined value or larger, and a PFM control is performed when the output detection current is smaller than the predetermined value.

22. The DC/DC converter according to claim 21, wherein setting of an oscillation frequency of the oscillator is controlled by the linear current when the PFM control is performed.

23. The DC/DC converter according to claim 21, wherein a minimum value of the oscillation frequency of the oscillator is above an audible frequency band when the PFM control is performed.

24. The DC/DC converter according to claim 19, further comprising:
an error amplifier arranged to compare a feedback voltage generated based on a voltage generated at the smoothing capacitor with a reference voltage having a predetermined value so as to output a difference between the both voltages as an error signal;

a slope voltage generating circuit arranged to generate a slope signal based on a rectangular wave signal generated by the oscillator; and a PWM comparator arranged to output a signal of a comparison result between the error signal and the slope signal.

25. The DC/DC converter according to claim 24, wherein a voltage component corresponding to the output detection current is superimposed on the slope signal.

26. The DC/DC converter according to claim 19, further comprising a rectifier element connected to a common node with the switching element and the inductor so as to supply current to the inductor when the switching element is turned off.

27. The DC/DC converter according to claim 26, further comprising a reverse current detection circuit arranged to detect a reverse current flowing from a ground potential to the common node, wherein when the reverse current detection circuit detects a predetermined reverse current, operation of the rectifier element or the switching element connected to the ground potential is turned off.

28. The DC/DC converter according to claim 24, wherein the error amplifier is a transconductance type.

29. The DC/DC converter according to claim 19, which is a current mode type or a voltage mode type.

30. The DC/DC converter according to claim 19, which is one of a step-down type, a step-up type, or a step-up/down type.

31. The DC/DC converter according to claim 19, wherein the oscillator further includes an oscillator portion arranged to repeat charging and discharging of a capacitor using the oscillator current so as to generate the rectangular wave signal.

32. The DC/DC converter according to claim 19, wherein the constant current source includes a constant voltage source arranged to generate a constant voltage and a voltage-current converter portion arranged to convert the constant voltage into the constant current.

33. The DC/DC converter according to claim 19, wherein the oscillator includes a current mirror circuit, which is operable to generate each of the constant current and the linear current, adding them, subtracting them, and setting a current ratio between them.

34. A DC/DC converter comprising:
a switching element connected to an input voltage so as to be turned on and off;
a driving circuit arranged to perform ON/OFF control of the switching element;
an inductor arranged to flow a current controlled by the switching element;
a smoothing capacitor connected to the inductor so as to perform a rectifying operation together with the inductor;
an oscillator arranged to generate a rectangular wave signal for operating the driving circuit; and
an output current detecting portion arranged to detect output detection current flowing in the switching element or the inductor, wherein
the oscillator generates the rectangular wave signal at a fixed oscillation frequency when the output detection current is a predetermined value or larger, whereas the oscillator generates the rectangular wave signal at an oscillation frequency lower than the fixed oscillation frequency and proportional to the output detection current when the output detection current is smaller than the predetermined value, wherein the oscillator includes a constant current source arranged to generate a constant current regardless of the output detection current, and a linear current source arranged to generate a linear current responding to the output detection current, wherein oscillation frequency of the oscillator is set based on an oscillator current corresponding to the sum of the constant current and the linear current or a difference between them, wherein the linear current source includes a current output type differential amplifier arranged to generate the linear current corresponding to a voltage between both terminals of the switching element.

35. The DC/DC converter according to claim 34, wherein the linear current is fixed to a first current value when the output detection current is smaller than a first threshold value, and the linear current is variably controlled from the first current value to a second current value responding to the output detection current when the output detection current is larger than the first threshold value and smaller than a second threshold value, and the linear current is fixed to the second current value when the output detection current is larger than the second threshold value.

36. The DC/DC converter according to claim 34, wherein a PWM control is performed when the output detection current is a predetermined value or larger, and a PFM control is performed when the output detection current is smaller than the predetermined value.

37. The DC/DC converter according to claim 36, wherein setting of an oscillation frequency of the oscillator is controlled by the linear current when the PFM control is performed.

38. The DC/DC converter according to claim 36, wherein a minimum value of the oscillation frequency of the oscillator is above an audible frequency band when the PFM control is performed.

39. The DC/DC converter according to claim 34, further comprising:
an error amplifier arranged to compare a feedback voltage generated based on a voltage generated at the smoothing capacitor with a reference voltage having a predetermined value so as to output a difference between the both voltages as an error signal;
a slope voltage generating circuit arranged to generate a slope signal based on a rectangular wave signal generated by the oscillator; and
a PWM comparator arranged to output a signal of a comparison result between the error signal and the slope signal.

40. The DC/DC converter according to claim 39, wherein a voltage component corresponding to the output detection current is superimposed on the slope signal.

41. The DC/DC converter according to claim 34, further comprising a rectifier element connected to a common node with the switching element and the inductor so as to supply current to the inductor when the switching element is turned off.

42. The DC/DC converter according to claim 41, further comprising a reverse current detection circuit arranged to detect a reverse current flowing from a ground potential to the common node, wherein when the reverse current detection circuit detects a predetermined reverse current, operation of the rectifier element or the switching element connected to the ground potential is turned off.

43. The DC/DC converter according to claim 39, wherein the error amplifier is a transconductance type.

44. The DC/DC converter according to claim 34 which is a current mode type or a voltage mode type.

45. The DC/DC converter according to claim 34, which is one of a step-down type, a step-up type, or a step-up/down type.

46. The DC/DC converter according to claim 34, wherein the oscillator further includes an oscillator portion arranged to repeat charging and discharging of a capacitor using the oscillator current so as to generate the rectangular wave signal.

47. The DC/DC converter according to claim 34, wherein the constant current source includes a constant voltage source arranged to generate a constant voltage and a voltage-current converter portion arranged to convert the constant voltage into the constant current.

48. The DC/DC converter according to claim 34, wherein the oscillator includes a current mirror circuit, which is operable to generate each of the constant current and the linear current, adding them, subtracting them, and setting a current ratio between them.

* * * * *